United States Patent [19]

Rink

[11] 4,063,190

[45] Dec. 13, 1977

[54] $CO_2$ LASER

[75] Inventor: John P. Rink, Los Alamos, N. Mex.

[73] Assignee: The United States of America as represented by the United States Energy Research and Development Administration, Washington, D.C.

[21] Appl. No.: 645,168

[22] Filed: Dec. 30, 1975

[51] Int. Cl.$^2$ .............................................. H01S 3/223
[52] U.S. Cl. ................................................ 331/94.5 G
[58] Field of Search ......................... 331/94.5; 330/4.3

[56] References Cited

PUBLICATIONS

Krupke, W. F., "Method for Generating Coherent 14 and 16 μ Radiation in $CO_2$," UCID Report-16847, July 21, 1975, 10 pages.

Primary Examiner—William L. Sikes
Attorney, Agent, or Firm—Dean E. Carlson; Robert W. Weig; William W. Cochran, II

[57] ABSTRACT

The disclosure relates to a pulsed gas laser comprising an optical resonant cavity, a $CO_2$ lasing medium, structure for containing the $CO_2$ lasing medium within the optical cavity and a device for causing a population inversion in the lasing medium, with a novel improvement comprising structure for causing a laser pulse comprising a wavelength in the near 14 μm and near 16 μm range. The structure for cooling the $CO_2$ lasing medium to less than about −40° C as well is a structure for pumping the maximum inversion of $CO_2$ molecules within the lasing medium by minimizing the population in the 010 level.

5 Claims, 3 Drawing Figures

$CO_2$ LASER

The invention described herein was made in the course of, or under, a contract with the U.S. Energy Research and Development Administration.

FIELD OF THE INVENTION

The invention relates to gas lasers and in particular to an improved $CO_2$ laser having an output in the 14–16 μm range.

BACKGROUND OF THE INVENTION

It is well known that $CO_2$ lasers conventionally produce output in the 9.6 and 10.6 μm range. However it has been a problem to obtain an output from any laser in the 16 μm range. A $CO_2$ laser capable of producing at least a fraction of a joule/μsec in the 16 μm range is desirable for the purposes of producing isotope separation in uranium. This invention opens an entire field of new, high power lasers utilizing different molecular gases.

SUMMARY OF THE INVENTION

In accordance with the present invention there is provided in a pulsed gas laser comprising an optical resonant cavity tuned for two wavelength regions, i.e., 9.4–10.6 μm wavelength region and 14–16 μm wavelength region, a $CO_2$ lasing medium, a structure for containing the $CO_2$ lasing medium within the optical cavity and a device for causing a population inversion in the lasing medium, an improvement comprising structure for maximizing the population in the 100 and 020 levels in a minimum of time by pumping the maximum number of $CO_2$ molecules to the 001 level and minimizing the population of molecules in the 010 level to provide a laser pulse comprising a wavelength of about 14 μm and about 16 μm. In one embodiment, the structure for producing the desired output comprises a system for cooling a $CO_2$ lasing medium to approximately −30° C.

One object of the present invention is to provide a laser pulse in the near 14 and near 16 μm region. Another object of the present invention is to provide a pulse of energy suitable for use in uranium isotope separation.

One advantage of the present invention is that in accordance therewith, near 14 μm and near 16 μm pulses can be produced utilizing existing $CO_2$ lasers incorporating an improvement.

Another advantage of the instant invention is that the improvement to $CO_2$ lasers offered thereby is simple, efficient, and economical.

Other objects and advantages of the instant invention will be apparent to those skilled in the art from the following disclosure with reference to the appended drawings wherein like numbers denote like parts and wherein:

DETAILED DESCRIPTION OF THE INVENTION

Figure 1A:
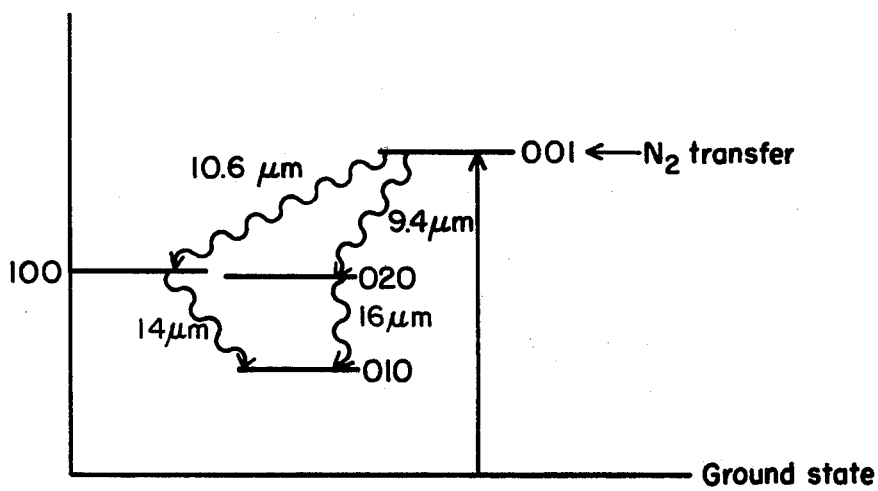
FIG. 1A comprises a $CO_2$ energy level diagram.
Figure 1B:
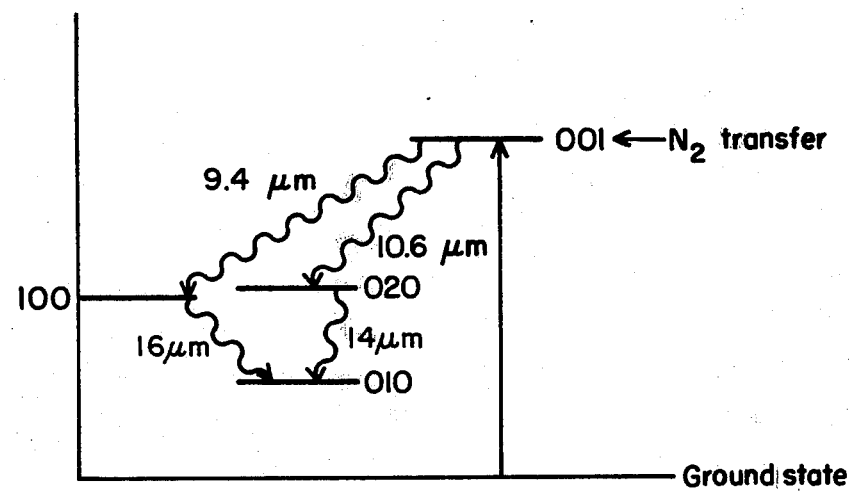
FIG. 1B comprises an alternate $CO_2$ energy level diagram.

The hereinbelow discussed embodiments of the present invention utilize a laser pump by the lasing action of the $CO_2$ molecules in the well known 10.6 and 9.6 μm regions. The lasing action in these regions causes a large increase in population of the 100 or 020 states. In practicing the invention, the inversion between states 100 and 020, and the 010 state is utilized to produce near 14 and near 16 μm radiation. FIG. 1A shows the popularly accepted energy level diagram for $CO_2$ in the transitions between these states whereas FIG. 1B shows a similar but slightly different $CO_2$ energy level diagram which is probably more correct. In any event, it is important to note that notwithstanding the correctness of either drawing, near 16 μm radiation is emitted from the lower of the two energy levels (100 or 020) while near 14 μm radiation is emitted from the higher of the two energy levels as shown in FIGS. 1A and 1B. However, the invention can be adequately described with reference to either energy level diagram.

Figure 2:
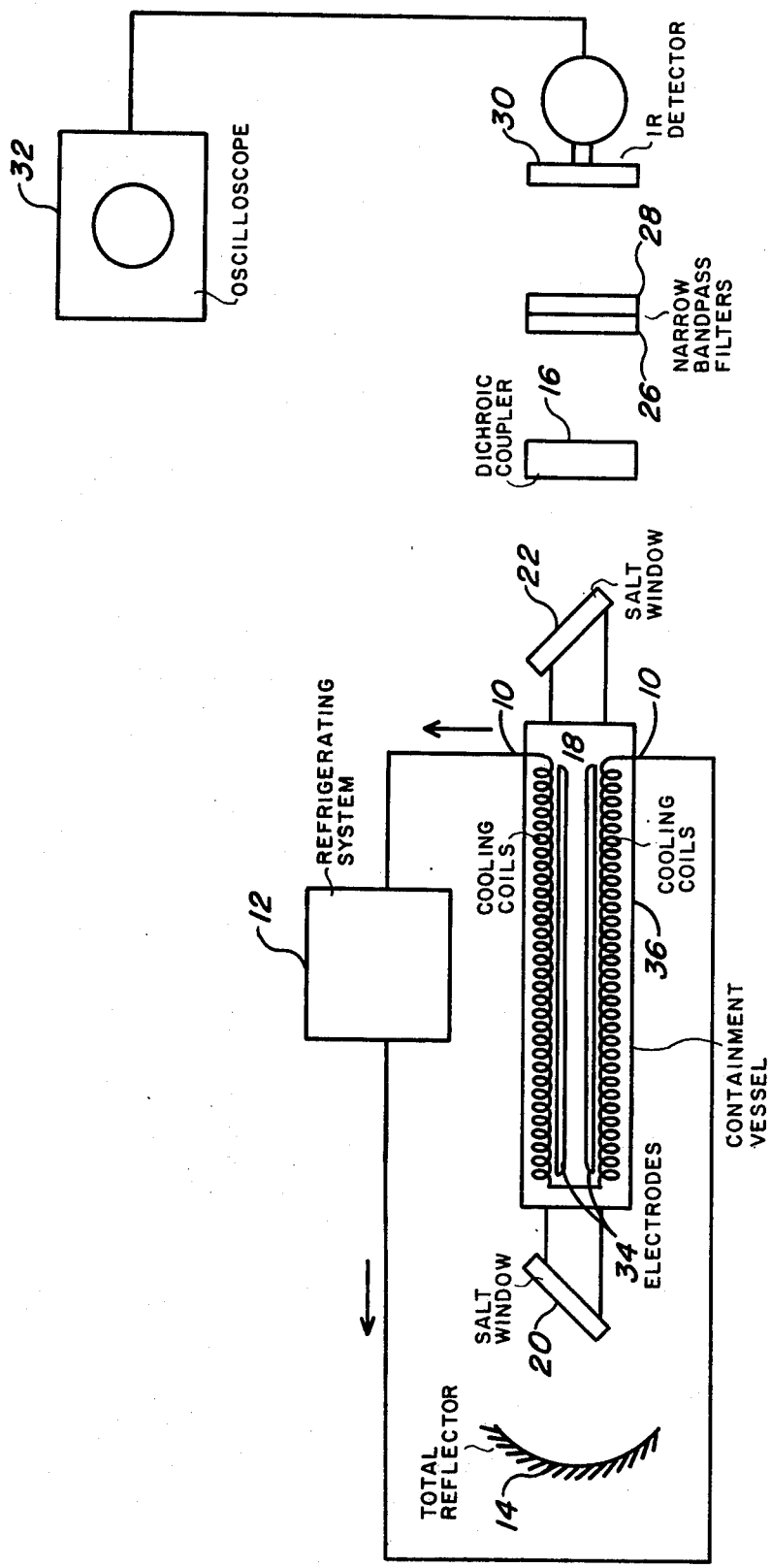
FIG. 2 comprises a preferred embodiment of the invention.

Inversion can be accomplished in the embodiment shown in FIG. 2 which illustrates a system wherein the $CO_2$ lasing medium is pumped, e.g., by any one of the well-known, common methods such as electron beam pumping, double discharge pumping, and optical pumping, to obtain a maximum number of $CO_2$ molecules at the 001 level to get a laser pulse in the 9.6 μm or 10.6 μm region in order to maximize population in the 100 and 020 levels in the shortest time. FIG. 2 also illustrates a $CO_2$ laser wherein the $CO_2$ gas is cooled in order to lower the percentage of $CO_2$ molecules in the 010 level. It will, therefore, be appreciated by those skilled in the art that the FIG. 2 embodiment can be utilized to attain the population inversion necessary in order to obtain lasing in the 14–16 μm region, not only by decreasing the population in the 010 level by cooling of the $CO_2$ gas but also by increasing the population in the 100 and 020 levels by the irradiation of 10.6 μm and 9.4 μm radiation respectively from the $CO_2$ medium.

FIG. 2 shows an embodiment of the invention utilizing a cooled $CO_2$ lasing medium. The cooling coils 10 are located inside a conventional laser gas containment vessel 36 in good physical contact with the electrodes 34. The coolant fluid may comprise either $LN_2$ or alcohol recirculated through a refrigerating system 12. The optical resonator cavity comprises a curved total reflector 14 and a dichroic output coupler 16. The dichroic output coupler 16 is a partial transmitter in the 9.6 to 10.6 μm and 14 to 16 μm wavelength ranges. This embodiment provides a laser cavity tuned to two separate wavelength regions, i.e., both the 9.4 and 10.6 μm wavelengths region and the near 14 and near 16 μm wavelength region so that the lasers are capable of operating in both of these regions simultaneously while still utilizing the same $CO_2$ lasing media 18. Brewster angle Salt windows 20 and 22 transmit both of these in wavelength regions and comprise part of the $CO_2$ laser gas confinement vessel. Two ir narrow bandpass filters 26 and 28 provide a million to 1 attenuation of all radiation outside the 14 to 16 μm region. The desired signal may be detected by an ir detector 30 and displayed on an oscilloscope 32.

Those skilled in the art will appreciate that the vibration relaxation rates for the 100 and 020 energy levels are quite fast, i.e., on the order of microseconds. Therefore fast pumping of the 100 and 020 levels as well as minimizing the population on the 010 level is necessary to get lasing in the 14-16 μm region in accordance with the invention.

The various features and advantages of the invention are thought to be clear from the foregoing description. However, various other features and advantages not specifically enumerated will undoubtedly occur to those versed in the art, as likewise will many variations and modifications of the preferred embodiment illustrated, all of which may be achieved without departing from the spirit and scope of the invention as defined by the following claims.

What I claim is:

1. In a pulsed gas laser comprising an optical resonant cavity, a $CO_2$ lasing medium, means for comprising said $CO_2$ lasing medium within said optical cavity, and means for causing a population inversion in said lasing medium, an improvement comprising:
    means for cooling the $CO_2$ lasers as to lower the number of $CO_2$ molecules already at the 010 level to obtain an inversion between the 100 and 020 energy levels and the 010 energy levels to provide a laser pulse comprising a wavelength of about 14 μm and about 16 μm.

2. The invention of claim 1 wherein said cooling means comprises means for cooling to approximately −40° C.

3. A device for producing near 14 and near 16 μm radiation in a $CO_2$ gas laser comprising:
    means for cooling said $CO_2$ gas to decrease the number of molecules in the 010 energy state in said $CO_2$ gas;
    means for increasing the number of molecules of said $CO_2$ gas in the 020 and 100 energy states;
    means for tuning said laser cavity to transmit both 9.4 to 10.6 μm wavelength radiation and near 14 μm and near 16 μm wavelength radiation;
    whereby vibration inversion from said 020 and 100 to said 010 level is enhanced to produce near 14 and near 16 μm radiation.

4. The device of claim 3 wherein said means for increasing said number of molecules in said 020 and 100 states comprises means for fast pumping said $CO_2$ gas to increase population of said 001 state and consequently increasing population of said 100 and 020 states as a result of the emission of 10.6 μm and 9.4 μm wavelength radiation, respectively, from said cavity.

5. The device of claim 3 wherein said means for tuning comprises a dichroic coupler tuned to 9.4 and 10.6 μm and near 14 and near 16 μm wavelength radiation.

* * * * *